United States Patent
Boreham

(10) Patent No.: US 11,546,769 B1
(45) Date of Patent: Jan. 3, 2023

(54) NGFW (NEXT GENERATION FIREWALL) SECURITY INSPECTION OVER MULTIPLE SESSIONS OF MESSAGE SESSION RELAY PROTOCOL (MSRP) ON A DATA COMMUNICATION NETWORK

(71) Applicant: Fortinet, Inc., Sunnyvale, CA (US)

(72) Inventor: Douglas Malcolm Boreham, Kearny, NJ (US)

(73) Assignee: Fortinet, Inc., Sunnyvale, CA (US)

( * ) Notice: Subject to any disclaimer, the term of this patent is extended or adjusted under 35 U.S.C. 154(b) by 10 days.

(21) Appl. No.: 17/364,740

(22) Filed: Jun. 30, 2021

(51) Int. Cl.
  *H04W 12/128* (2021.01)
  *H04W 12/106* (2021.01)
  *H04W 12/122* (2021.01)

(52) U.S. Cl.
  CPC ....... *H04W 12/128* (2021.01); *H04W 12/106* (2021.01); *H04W 12/122* (2021.01)

(58) Field of Classification Search
  CPC H04W 23/128; H04W 12/106; H04W 12/122
  See application file for complete search history.

(56) References Cited

U.S. PATENT DOCUMENTS

| | | | | |
|---|---|---|---|---|
| 8,464,053 B2* | 6/2013 | Davis | ......... | H04L 63/0464 713/168 |
| 8,935,533 B2* | 1/2015 | Kim | ......... | H04L 9/0838 713/181 |
| 8,958,559 B2* | 2/2015 | Medina | ......... | H04W 12/062 709/227 |
| 9,119,067 B2* | 8/2015 | Santamaria | ......... | H04W 12/069 |
| 9,179,185 B2* | 11/2015 | Fry | ......... | H04N 21/44218 |
| 9,210,183 B2* | 12/2015 | Sadovsky | ......... | H04L 63/1408 |
| 10,491,580 B2* | 11/2019 | Ohlsson | ......... | H04L 63/08 |
| 10,693,879 B2* | 6/2020 | Salmela | ......... | H04L 63/166 |
| 2016/0080406 A1* | 3/2016 | Sadovsky | ......... | H04L 63/1408 726/23 |
| 2019/0387401 A1* | 12/2019 | Liao | ......... | H04W 8/08 |

* cited by examiner

*Primary Examiner* — Viral S Lakhia
(74) *Attorney, Agent, or Firm* — Law Office Of Dorian Cartwright; Dorian Cartwright

(57) ABSTRACT

One or more MSRP data packets are received from a first MSRP session and creates a first log entry. One or more MSRP data packets are also received from a second MSRP session and create a second log entry. A correlation between the first and second MSRP sessions based on MDNs can be detected, and mapped correlating information to malicious activity. The mapping includes reconstructing MSRP messages sent from a source and encapsulated in a data field of the packets, including MDNs, and matching to at least one threat from a malicious activity database. In response to the threat matching, to conduct a security action on the first and second MSRP sessions.

8 Claims, 5 Drawing Sheets

NGFW (NEXT GENERATION FIREWALL) SECURITY INSPECTION OVER MULTIPLE SESSIONS OF MESSAGE SESSION RELAY PROTOCOL (MSRP) ON A DATA COMMUNICATION NETWORK

FIELD OF THE INVENTION

The invention relates generally to computer networking, and more specifically, to a NGFW (next generation firewall) scrutinizing across a plurality of MSRP text message sessions to identify malicious activity.

BACKGROUND

Text to 911 and Next-Generation 911 systems are available on large cellular providers (e.g., AT&T, Sprint, T-Mobile and Verizon) and are being rolled out by many Emergency Services/First Responder providers around the globe in conjunction with a SIP (session initiation protocol) architecture. These Emergency Services/First Responder systems provide a life-critical service to local communities around the world, including police, fire, and ambulance dispatch, as well to report terrorist attacks and mass casualty events. They enable PSAPs to perform call transfer and data sharing and allow them to accept calls from mobile, text and voice applications. Text to 911 is critical in situations when a voice call would be dangerous, for young people that prefer text communication, and when anonymity of text makes a caller choose it over voice. A failure of these systems could be catastrophic to the local community it serves.

For example, NextGen 911 are vulnerable to code snippets, such as SQL injection, malicious URL or file attachments, man-in-the-middle attacks, DoS attacks, and unauthorized network access to name a few. The systems that process the MSRP traffic are proprietary and self-contained, and it is therefore not possible to perform security inspection after this traffic has been decoded by TCCs (text control centers). As a result, it is possible for MSRP to tunnel malware to the end station and potentially infect or otherwise compromise its integrity. MSRP is defined by RFC 4975 as an instant message protocol for sharing messages as well as other data within attachments. It is used to facilitate large-scale instant messaging. MSRP can act as stand-alone protocol but is also often negotiated via SIP/SDP (message type) similar to the way RTP is negotiated.

Additionally, these Emergency Services/First Responder systems have limited processing power, and they are vulnerable to Denial of Service (DoS)/Distributed Denial of Service (DDoS) attacks. Often these DoS/DDoS attacks take the form of repeated text messages that are being transmitted far faster than a human sending text messages can produce.

Therefore, what is needed is a robust technique for scrutinizing across a plurality MSRP text message sessions to identify malicious activity.

SUMMARY

These shortcomings are addressed by the present disclosure of methods, computer program products, and systems for scrutinizing across a plurality of MSRP text message sessions to identify malicious activity.

In one embodiment, a first module receives one or more MSRP data packets from a first MSRP session and creates a first log entry. The first module also receives one or more MSRP data packets from a second MSRP session and create a second log entry. A second module detects a correlation between the first and second MSRP sessions based on MDNs, and maps correlating information to malicious activity. The mapping includes reconstructing MSRP messages sent from a source and encapsulated in a data field of the packets, including MDNs, and matching to at least one threat from a malicious activity database.

In another embodiment, a third module, in response to the threat matching, to conduct a security action on the first and second MSRP sessions. For example, text message rates can be controlled by MDN (mobile device number) to correlate attacks on the system spread out over multiple MSRP sessions.

Advantageously, network performance and computer network performance are improved by increased protection to MSRP sessions and E911 call centers.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for scrutinizing across multiple MSRP text message sessions to identify malicious activity. One of ordinary skill in the art will recognize many additional variations made possible by the succinct description of techniques below.

I. Systems for Multiple MSRP Text Message Session Attack Prevention (FIG. 1-2)

Figure 1:
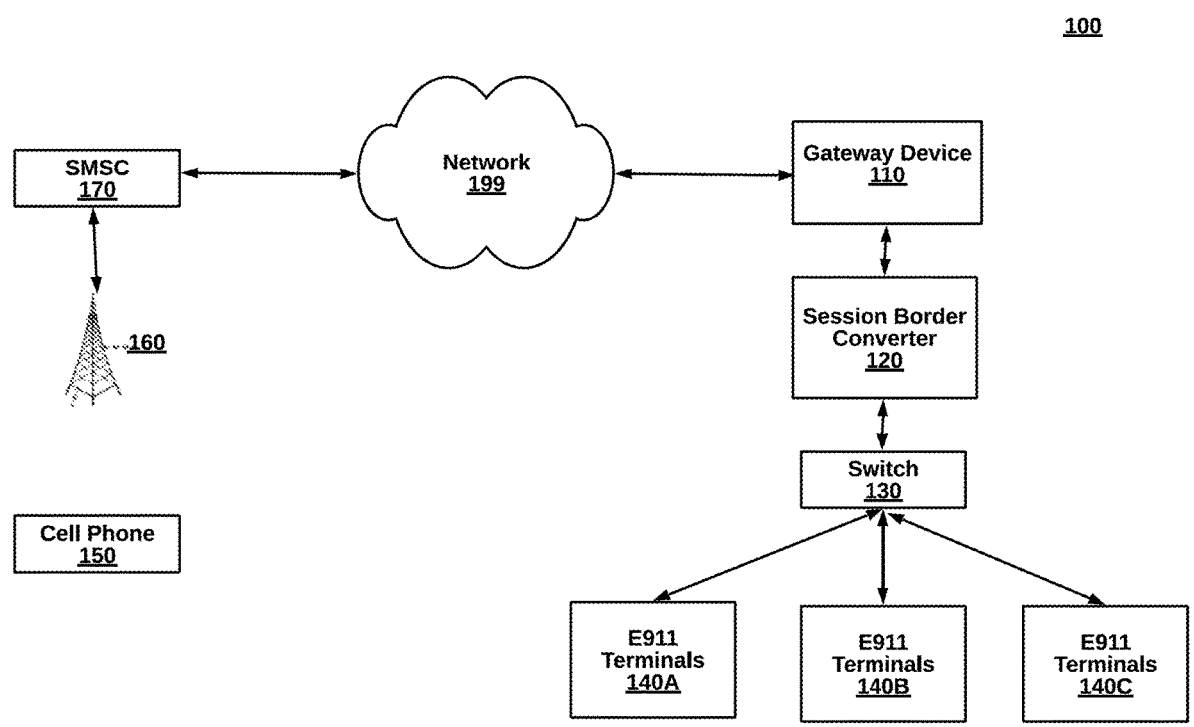
FIG. 1 are high-level block diagrams illustrating a system for scrutinizing across multiple MSRP text message sessions to identify malicious activity, according to one embodiment.
Figure 2:
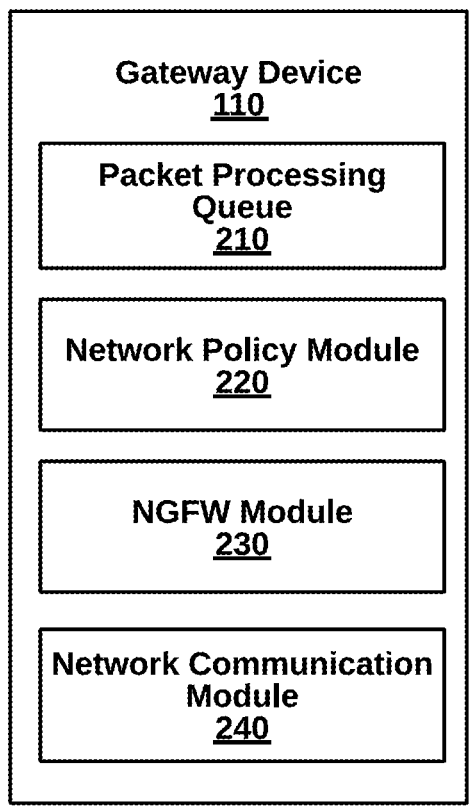
FIG. 2 is a more detailed block diagram illustrating a gateway device of the system of FIG. 1, according to an embodiment.

FIG. 1 are high-level block diagrams illustrating a system 100 for scrutinizing across multiple MSRP text message sessions to identify malicious activity, according to one embodiment. The system 100 includes a gateway device 110, a session border controller 120, a switch 130, and E911 terminals 140A-C. Many other embodiments are possible, for example, with more or fewer access points, more or fewer stations, and additional components, such as firewalls, routers and switches. Hardware and software components can be implemented similar to the example of FIG. 6.

A wide area network 199 links components of the system 100 with a channel for data communication. The gateway device 110, the session border controller 120, the switch 130 and the terminals 140 are preferably connected to the wide area network 199 via hardwire.

The gateway device 110, in one embodiment, filters data messages flowing into and out of the network 199 including MSRP data sessions from E911 text messages headed to PSAPs (public safety answering points), for malicious attacks. As a result, a single attack spread over different telephone numbers can be identified, such as code snippets, SQL injection, malicious URL or file attachments, and the like. The MSRP messages can be sent from a mobile telephone 150 across a cellular network to an SMSC (short message center) 170 to a TCC (text control center). The TCC can combine the SMSC message sent over SMPP, a location sent by a commercial location server over MLP, and a SMSC (multimedia message center) message from an ESRP (Emergency Services Routing Proxy). The ESRP conducts uninspected SIP and MSRP sessions with the gateway device 110. The uninspected sessions are then scrutinized for malicious behavior using a common telephone number or MDN before allowing messages to proceed to the E911 call center. The gateway device 110 is described in more detail below.

The session border converter 120 can connect support multiple concurrent MSRP and SIP sessions connected through the switch 130 to the terminals 140.

The E911 terminals 140A-C allow communication between a dispatch officer and a user of cell phone 150. The communication can be completely by back-and-forth text. The communication can also switch from text to a telephone call over a cellular or VOIP network.

Figure 6:
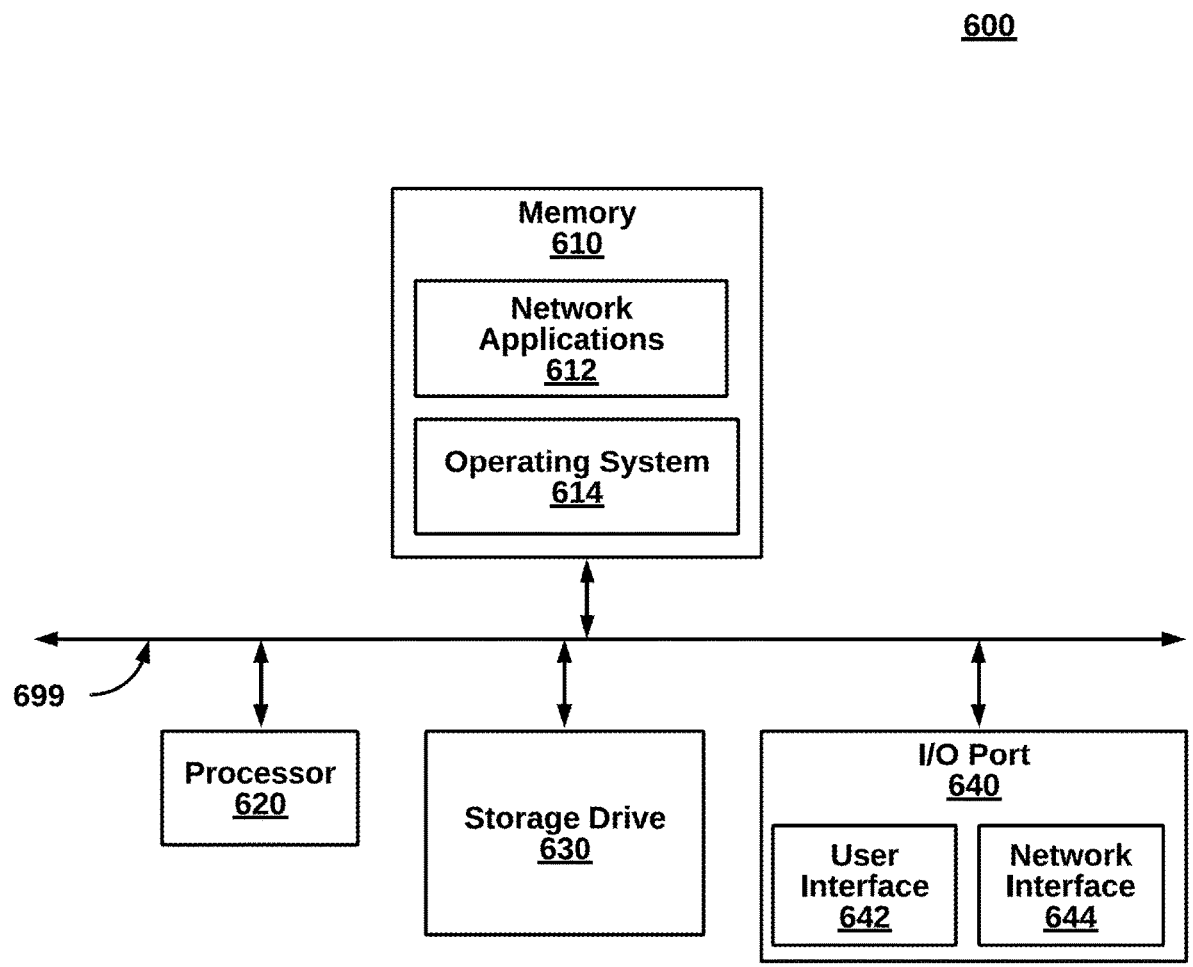
FIG. 6 is a block diagram illustrating an example computing device for malicious activity detection techniques, according to one embodiment.

The network components of the system 100 can implemented in any of the computing devices discussed herein, for example, a personal computer, a laptop computer, a tablet computer, a smart phone, a smart watch, a mobile computing device, a server, a cloud-based device, a virtual device, an Internet appliance, an IoT (Internet of things) device, or any of the computing devices described herein, using hardware and/or software (see e.g., FIG. 6).

FIG. 2 is a more detailed block diagram illustrating the gateway device 110 of the system 100, according to an embodiment. The gateway device 110 comprises a packet processing queue 210, a network policy module 220, a NGFW module 230, and a network communication interface 240. Many other variations are possible. The components can be implemented in hardware, software, or a combination of both.

Inbound and outbound packets are stored in the packet processing queue 210 for scrutinizing before passing in or out of an enterprise network. The network policy module 220 implements rules set by administrators and automatically by the system 100. The network communication interface 240 provides a connection port to the communication channel and protocol support for packetizing data.

Figure 3:
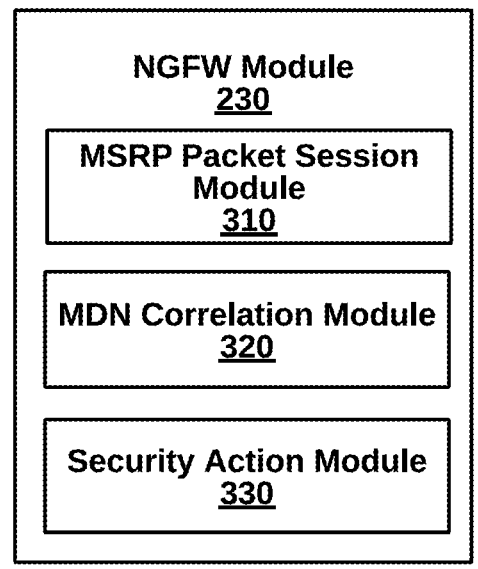
FIG. 3 is a more detailed block diagram illustrating a MSRP attack prevention module of the gateway device of FIG. 2, according to an embodiment.

In FIG. 3, one embodiment of the NGFW module 230 is shown in more detail. The NGFW module 230 includes a MSRP packet session module 310, an MDN (mobile device number) correlation module 320, and a security action module 330.

The MSRP packet session module 210, in an embodiment, receive one or more MSRP data packets from a first MSRP session and create a first log entry, receives one or more MSRP data packets from a second MSRP session and create a second log entry.

The MDN correlation module 220 comprises an MSRP decoder to detect a correlation between the first and second MSRP sessions based on MDNs, and map correlating information to malicious activity. The mapping includes reconstructing MSRP messages sent from a source and encapsulated in a data field of the packets, including MDNs, and matching to at least one threat from a malicious activity database. For example, a DoS attack can be identified as generating MSRP messages much faster than a human can type and block actual E911 calls.

The security action module 230, in response to the threat matching, conducts a security action on the first and second MSRP sessions. In one instance, rate limiting is implemented for MSRP messages overall, message rate control on SIP and MSRP based on MDN, text messages are inspected for malware-based attacks such as XSS (cross-site scripting) and SQL injection, embedded URL and files are inspected for malicious components, IPS signature sets are applied to MSRP traffic, and detection and flagging of repeated MSRP messages.

II. Methods for Multiple MSRP Text Message Session Attack Prevention (FIGS. 4-5)

Figure 4:
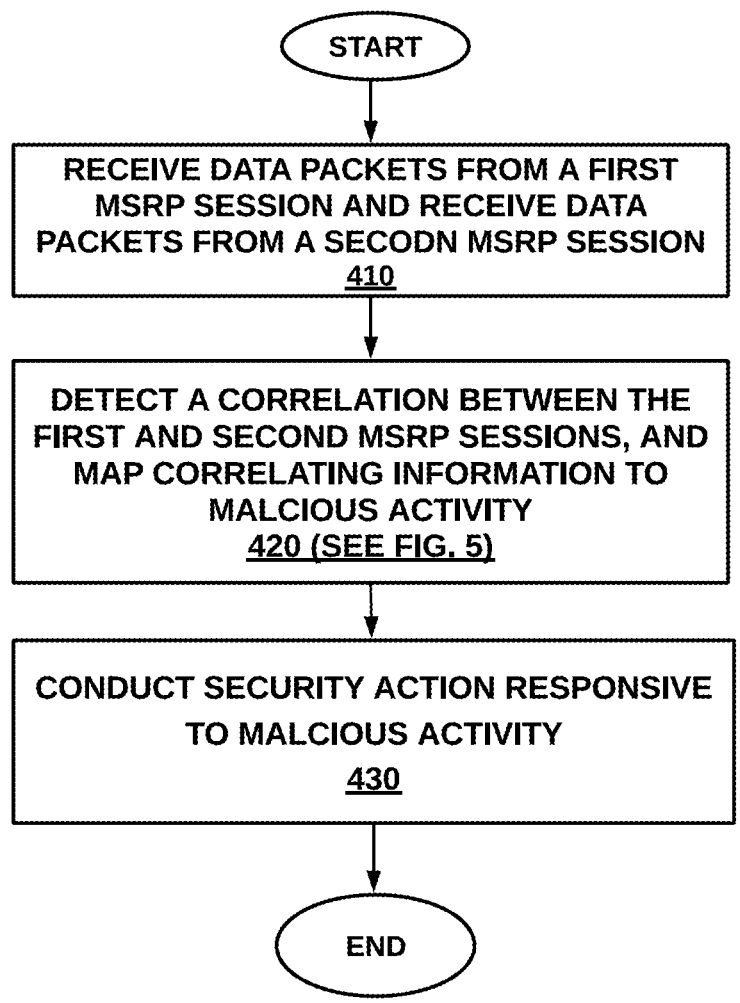
FIG. 4 is a high-level flow diagram illustrating a method for scrutinizing across a plurality MSRP text message sessions to identify malicious activity, according to one embodiment.
Figure 5:
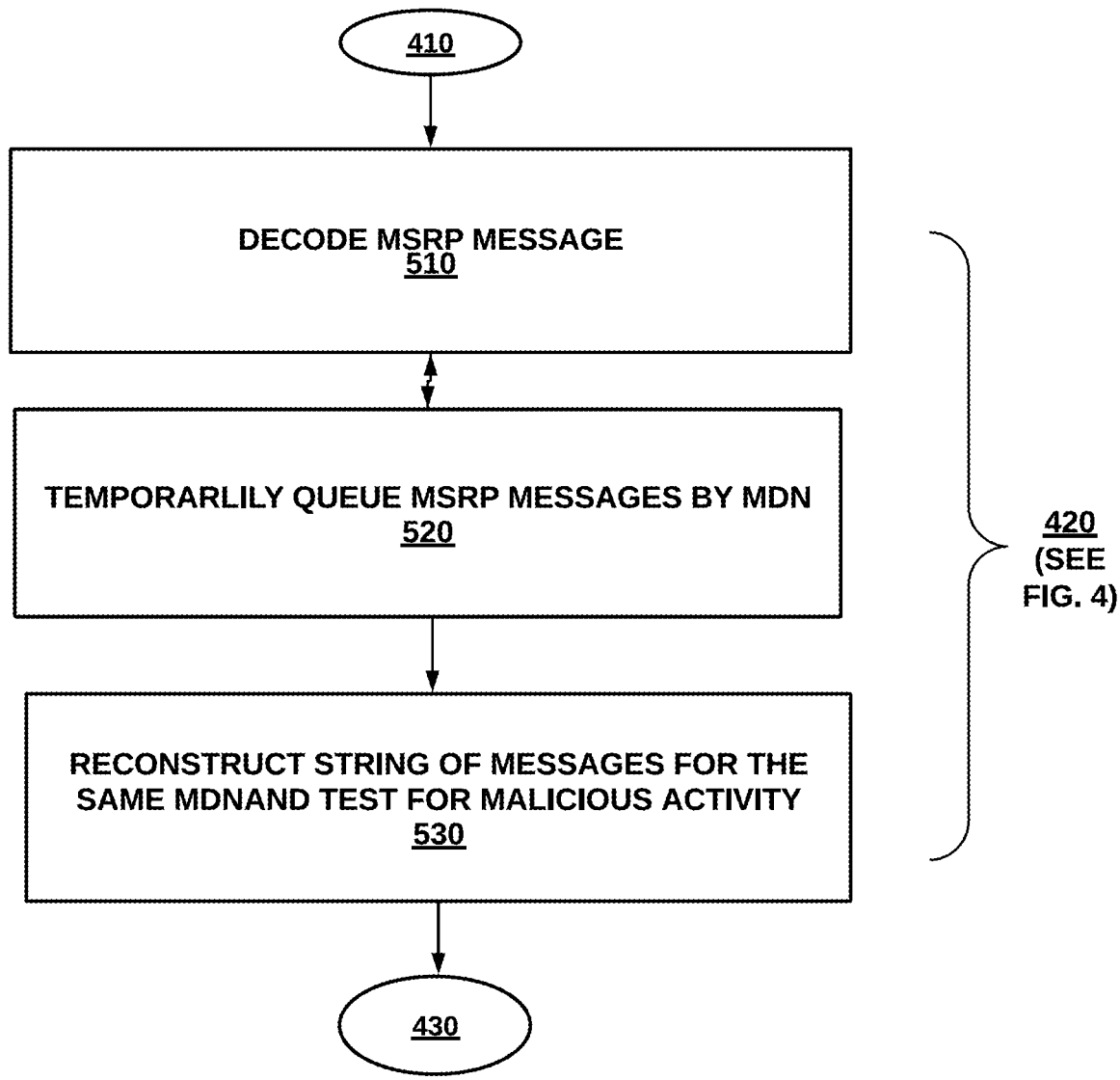
FIG. 5 is a more detailed flow diagram illustrating a step of deploying idle transceivers of MIMO transceiver chains for rapid connection of Wi-Fi clients of the method of FIG. 4, according to an embodiment.

FIG. 4 is a high-level flow diagram illustrating a method for scrutinizing across a plurality MSRP text message sessions to identify malicious activity, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, one or more MSRP data packets is received from a first MSRP session and create a first log entry, and to receive the one or more MSRP data packets from a second MSRP session and create a second log entry.

At step 420, a correlation is detected between the first and second MSRP sessions based on MDNs, and map correlating information to malicious activity. The mapping includes reconstructing MSRP messages sent from a source and encapsulated in a data field of the packets, including MDNs, and matching to at least one threat from a malicious activity database.

As shown in more detail in FIG. 5, step 420 can be implemented at step 510, in which MSPR messages are decoded. At step 520, messages are temporarily queued by MDN. At step 530 string of messages for the same MDN can be reconstructed and tested for malicious activity by comparison to a database of known malicious activity.

Referring again to FIG. 4, at step 430, in response to the threat matching, a security action is conducted on the first and second MSRP sessions.

III. Generic Computing Device for MSRP Attack Prevention (FIG. 6)

FIG. 6 is a block diagram illustrating an example computing device 600 for use in the system 100 of FIG. 1, according to one embodiment. The computing device 600 is implementable for each of the components of the system 100 including the gateway device 110, the session border controller 120, the switch 130, and the terminals 140. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A network device on a data communication network for scrutinizing across a plurality of Message Session Relay Protocol (MSRP) text message sessions to identify malicious activity, the network device comprising:
    a processor;
    a network interface, communicatively coupled to the data communication network and to a Wi-Fi network; and
    a memory, storing source code comprising:
        a first module to receive one or more MSRP data packets from a first MSRP session and create a first log entry, and to receive the one or more MSRP data packets from a second MSRP session and create a second log entry;
        a second module to detect a correlation between the first and second MSRP sessions based on MDNs, and map correlating information to malicious activity, wherein the mapping includes reconstructing MSRP messages sent from a source and encapsulated in a data field of the packets, including Mobile Device Numbers (MDNs), and matching to at least one threat from a malicious activity database, and wherein detecting further comprises detecting time of message field to determine message transmission rate, wherein mapping to malicious activity includes an anomaly in the message transmission rate; and
        a third module, in response to the threat matching, to conduct a security action on the first and second MSRP sessions.

2. The network device of claim 1, wherein the first and second MSRP messages comprise E911 type messages.

3. The network device of claim 1, wherein the malicious activity comprises identical messages sourced from distinct MDNs.

4. The network device of claim 1, wherein the malicious activity comprises identical messages sourced from the same MDN.

5. The network device of claim 1,
    detecting GPS coordinate field from the first and second MSRP session, wherein mapping to malicious activity includes an anomaly between GPS coordinate values.

6. The network device of claim 1, wherein taking the security action comprises at least one of: blocking the messages, notifying a network administrator, notifying the sender or receiver.

7. A non-transitory computer-readable media storing source code that, when executed by a processor, performs a computer-implemented method, in a gateway device coupled to a plurality of access points on a data communication network, for scrutinizing across a plurality of Message Session Relay Protocol (MSRP) text message sessions to identify malicious activity, the method comprising the steps of:

receiving one or more MSRP data packets from a first MSRP session and create a first log entry, and to receive the one or more MSRP data packets from a second MSRP session and create a second log entry;

detecting a correlation between the first and second MSRP sessions based on Mobile Device Numbers (MDNs), and map correlating information to malicious activity, wherein the mapping includes reconstructing MSRP messages sent from a source and encapsulated in a data field of the packets, including MDNs, and matching to at least one threat from a malicious activity database, and wherein detecting further comprises detecting time of message field to determine message transmission rate, wherein mapping to malicious activity includes an anomaly in the message transmission rate; and in response to the threat matching, conducting a security action on the first and second MSRP sessions.

8. A computer-implemented method a gateway device coupled to a plurality of access points on a data communication network, for scrutinizing across a plurality of Message Session Relay Protocol (MSRP) text message sessions to identify malicious activity, the Wi-Fi controller comprising:

receiving one or more MSRP data packets from a first MSRP session and create a first log entry, and to receive the one or more MSRP data packets from a second MSRP session and create a second log entry;

detecting a correlation between the first and second MSRP sessions based on Mobile Device Numbers (MDNs), and map correlating information to malicious activity, wherein the mapping includes reconstructing MSRP messages sent from a source and encapsulated in a data field of the packets, including MDNs, and matching to at least one threat from a malicious activity database, and wherein detecting further comprises detecting time of message field to determine message transmission rate, wherein mapping to malicious activity includes an anomaly in the message transmission rate; and in response to the threat matching, conducting a security action on the first and second MSRP sessions.

* * * * *